US009025826B2

(12) United States Patent
Kirenko et al.

(10) Patent No.: US 9,025,826 B2
(45) Date of Patent: *May 5, 2015

(54) FORMATION OF A TIME-VARYING SIGNAL REPRESENTATIVE OF AT LEAST VARIATIONS IN A VALUE BASED ON PIXEL VALUES

(71) Applicant: Koninklijkle Philips N.V., Eindhoven (NL)

(72) Inventors: Ihor Kirenko, Eindhoven (NL); Vincent Jeanne, Eindhoven (NL); Gerard de Haan, Eindhoven (NL)

(73) Assignee: Koninklijkle Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,976

(22) Filed: Oct. 3, 2013

(65) Prior Publication Data

US 2014/0037163 A1     Feb. 6, 2014

Related U.S. Application Data

(63) Continuation of application No. 13/500,203, filed as application No. PCT/IB2010/054437 on Oct. 1, 2010, now Pat. No. 8,553,940.

(30) Foreign Application Priority Data

Oct. 6, 2009   (EP) .................................... 09172343

(51) Int. Cl.
   *G06K 9/00*      (2006.01)
   *G06T 7/00*      (2006.01)
   *G06T 7/20*      (2006.01)
(52) U.S. Cl.
   CPC ................ *G06T 7/0038* (2013.01); *G06T 7/20* (2013.01); *G06T 2207/30076* (2013.01)

(58) Field of Classification Search
   None
   See application file for complete search history.

(56) References Cited

U.S. PATENT DOCUMENTS

| 4,958,638 A | 9/1990 | Sharpe et al. |
| 5,719,950 A | 2/1998 | Osten et al. |

(Continued)

FOREIGN PATENT DOCUMENTS

| CN | 1613425 A | 5/2005 |
| CN | 1814322 A | 8/2006 |

(Continued)

OTHER PUBLICATIONS

Verkruysse et al: "Remote Plethysmographic Imaging Using Ambient Light"; Optics Express, vol. 16, No. 26, Dec. 2008, pp. 21434-21445.

(Continued)

*Primary Examiner* — Aaron W Carter
*Assistant Examiner* — Siamak Harandi

(57) ABSTRACT

A method of forming a time-varying signal representative of at test variations in a value based on pixel values from a sequence of images, the signal corresponding in length to the sequence of images, includes obtaining the sequence of images. A plurality of groups of sub-sets of pixel values are formed by selecting a sub-set of at least one pixel value from each of at least two images defining an interval to form a group of associated sub-sets using at least one of a different aperture and a different interval length for groups defined on different intervals of the sequence. Groups of sub-sets are selected to form the signal to cover different intervals of the sequence of images by obtaining spatio-temporal volumes of pixel values from a sequence of images at least based on the received sequence of images. Each volume includes pixel values within a spatial aperture from each image within an interval of the sequence.

48 Claims, 4 Drawing Sheets

(56) References Cited

U.S. PATENT DOCUMENTS

| | | | |
|---|---|---|---|
| 5,995,856 | A | 11/1999 | Mannheimer et al. |
| 7,354,380 | B2 | 4/2008 | Volpe, Jr. |
| 7,507,203 | B2 | 3/2009 | Sebastian et al. |
| 2003/0163032 | A1 | 8/2003 | Terry |
| 2004/0218787 | A1 | 11/2004 | Tagami et al. |
| 2005/0058456 | A1 | 3/2005 | Yoo |
| 2007/0024946 | A1 | 2/2007 | Panasyuk et al. |
| 2008/0045847 | A1 | 2/2008 | Farag et al. |
| 2008/0273768 | A1 | 11/2008 | Dennis et al. |
| 2009/0018409 | A1 | 1/2009 | Banet et al. |
| 2009/0045847 | A1 | 2/2009 | Lin et al. |
| 2009/0082642 | A1 | 3/2009 | Fine |
| 2009/0141124 | A1 | 6/2009 | Liu et al. |
| 2009/0225827 | A1 | 9/2009 | Sang et al. |
| 2011/0251493 | A1 | 10/2011 | Poh et al. |

FOREIGN PATENT DOCUMENTS

| | | |
|---|---|---|
| CN | 101112307 A | 1/2008 |
| CN | 101299967 A | 11/2008 |
| EP | 1764034 A2 | 3/2007 |
| EP | 2087837 A1 | 8/2009 |
| WO | 8804152 A1 | 6/1988 |
| WO | 0044274 A2 | 8/2000 |
| WO | 0167960 A2 | 9/2001 |
| WO | 2004093676 A1 | 11/2004 |
| WO | 2005051190 A1 | 6/2005 |
| WO | 2008129482 A2 | 10/2008 |
| WO | 2010100594 A2 | 9/2010 |

OTHER PUBLICATIONS

Viola et al: "Robust Real-Time Object Detection"; Proceedings of IEEE Second Internatioanl Workshop on Statistical and Computational Theories of Vision-Modeling, Learning and Computing, and Sampling, Vancouver, Canada, Jul. 2001, 25 Page Article.
De Haan et al: "True-Motion Estimation With 3-D Recursive Search Block Matching"; IEEE Transactions on Circuits and Systems for Video Technology, vol. 3, No. 5, Oct. 1993, pp. 368-379.
Takano et al:"Heart Rate Measurement Based on a Time-Lapse Image"; Science Direct, Medical Engineering & Physics, vol. 29, 2007, pp. 853-857.
Yang et al: "Vital Sign Estimation From Passive Thermal Video"; IEEE Conference on Computer Vision and Pattern Recognition, 2008, CVPR, Jun. 2008, pp. 1-8.
Mohan et al: "Contact-Less, Multi Spectral Imaging of Dermal Perfusion"; IEEE Instrumentation and Measaurement Technology Conference, May 2008, Vancouver Island, Canada, pp. 793-796.
Wieringa et al: "Contactless Multiple Wavelength Photoplethysmographic Imaging: A First Step Toward 'sPO2 Camera' Technology"; Annals of Biomedical Engineering, Aug. 20005, vol. 33, No. 8, pp. 1034-1041.
Hu et al: "Feasibility of Imaging Photoplethysmography"; IEEE International Conference on Biomedical Engineering and Informatics, May 2008, pp. 72-75.
Viola et al: "Robust Real-Time Face Detection"; International Journal of Computer Vision, vol. 57, No. 2, pp. 137-154, 2004.
Hulsbusch, m:"Ein Bildgestutztes, Funktionelles Verfahren Zur Optoelektronischen Erfassung Der Hautperfusion"; Dissertation Technischen Hochschule Aachen, Jan. 28, 2008, 145 Page Document.
Lucchese et al: Color Image Segmentation: A State-Of-The-Art Survey: Proceedings of the Indian Natioanl Science Academy, New Dehli, India, Part A Physical Sciences, vol. 67, No. 2, Mar. 1, 2001, pp. 207-221.
Jens-Rainer: "Multimedia Communication Technology"; Multimedia Communication Technology, Jan. 2004, pp. 297-310.
Niebles et al: "Unsupervised Learning of Human Action Categories Using Spatial-Temporal Words"; Int. J. Comp. Vision, vol. 79, Issue 3, Sep. 2008, pp. 299-318.
Wu: "PPGI:New Development in Noninvasive and Contactless Diagnosis of Dermal Perfusion Using Near Infrared Light"; J. of the GCPD e.V., vol. 7, No. 1, Oct. 2003, pp. 17-24.
Wu et al: "Movement Artifact Reduction Strategies for Contactless Acquisition of Mapped Hemodynamic Data"; Institute of High Frequency Technology, Proceedings of the 9th Internaitonal Symposium of Computer-Aided Vascular Diagnostic, 2001, pp. 59-66.

FORMATION OF A TIME-VARYING SIGNAL REPRESENTATIVE OF AT LEAST VARIATIONS IN A VALUE BASED ON PIXEL VALUES

CROSS-REFERENCE TO RELATED APPLICATIONS

This application is a continuation of prior U.S. patent application Ser. No. 13/500,203, filed Apr. 4, 2012, which is a national application of PCT Application No. PCT/IB2010/054437, filed Oct. 1, 2010 and claims the benefit of European Patent Application No. 09172343.7, filed Oct. 6, 2009, the entire contents of each of which are incorporated herein by reference thereto.

FIELD OF THE INVENTION

The invention relates to a method and system for forming a time-varying signal representative of at least variations in a value based on pixel values from a sequence of images. The invention also relates to a computer program.

BACKGROUND OF THE INVENTION

US 2009/0141124 A1 relates to a system and method for infrared video-based vital sign measurement using subject alignment, signal enhancement and harmonic analysis. In the method, contour segmentation is first performed to locate a blood vessel to be measured. Then, the same set of segmentation parameters is used in all frames to segment the corresponding region. After that, motion compensation is performed by aligning all pixels in the selected region, across frames based on the segmentations position and scale in each frame. After the contour segmentation and motion compensation, spatial filtering is performed to remove noise not related to heart beat, and non-linear filtering is then performed to process the temporal, signal corresponding to each aligned pixel sequence. The signal spectrum of each pixel is then fed to a clustering algorithm for outlier removal. Pixels in the largest cluster are then used to select the dominant frequency, and the median of the dominant frequency is output as the pulse rate.

A problem of the known method is that the outlier removal does not function well when the alignment of the segments has not been carried out accurately enough. In certain situations, particularly where the differences between corresponding pixels are at or below the quantization error of the pixel values, alignment is not accurate enough.

SUMMARY OF THE INVENTION

It is desirable to provide a method, system and computer program of the types mentioned above that allow one to achieve a more accurate time-varying signal for use in spectral analysis, e.g. to determine a value of a biometric parameter from a sequence of video images.

To this end, according to one aspect of the invention there is provided a method of forming a time-varying signal representative of at least variations in a value based on pixel values according to the invention, which includes:
obtaining the sequence of images;
forming a plurality of groups of sub-sets of pixel values by selecting a sub-set of at least one pixel value from each of at least two images defining an interval to form a group of associated sub-sets,
wherein, for any pair of groups with only sub-sets from the same images, the sub-sets from more than one image are different; and
selecting groups of sub-sets to form the signal in accordance with at least one selection criterion,
wherein the selected groups of sub-sets cover different intervals, shorter than a length of the sequence.

Because groups of sub-sets of pixel values from each of at least two images are selected, it is possible to build differences, which is all that is required for spectral analysis. Thus, the signal that is obtained by the method will be representative of at least variations in color and/or intensity in at least a particular part of the image. This signal can then be used to determine the heart rate or respiration rate of an individual represented in that particular part of the image. By carrying out the selection step separately to cover different intervals of the signal, different pairs of corresponding sub-sets can be used for different intervals. For example, if a first sub-set is selected from a first image and a corresponding sub-set from a second image, then that pair can be used in the signal. For a next interval of the signal, corresponding to, for example, a next pair of images, a pair of corresponding sub-sets can be selected that does not correspond to the first sub-set from the first image. Only small-signal variations are of relevance to determining the value of the periodic phenomenon to be quantified (e.g. a biometric parameter such as the heart rate or respiration rate of a person represented in the sequence of images). The method is based on this realization, in that a region corresponding to a particular sub-set of pixels in a first image is not necessarily tracked throughout the entire sequence of images to form the signal for use in determining a value characterizing a periodic phenomenon. Rather, appropriate groups are selected for different intervals, which are fused to form a signal longer than any of the groups. The method therefore differs from a method in which a single region of interest is tracked throughout the sequence of images in that, for my pair of groups with only sub-sets from the same images, the sub-sets from more than one image are different.

In an embodiment, groups are formed by laying a grid over at least a region of each of a plurality of images at least based on the obtained images to obtain spatio-temporal volumes of pixel values, each comprising pixel values of each image within a corresponding spatial aperture defined by the grid.

An effect is that it is not necessary to search tor similar sub-sets in each of a plurality of images. A group is simply formed of sublets at corresponding positions in two or more images.

A variant of this embodiment includes, for each group, analyzing at least one sub-set of pixel values defined by the spatial aperture to determine whether it represents a part of a surface of a certain type.

The one or more sub-sets of pixels can in particular be analyzed to determine whether they have characteristics that indicate that they represent part of an area of exposed skin of a living being, more particularly, a human being. This embodiment is of use where the method is being used in the context of a photoplethysmographic method. It helps make sure that the time-varying signal represents variations in reflectance due to pulsating blood flow in that context.

In an embodiment of the method, groups are formed by obtaining spatio-temporal volumes of pixel values from a sequence of images at least based on the obtained sequence of images, each volume comprising pixel values within a spatial aperture from each image within an interval of the sequence, the method including using a different aperture for groups defined on different intervals of the sequence.

This embodiment allows for an adjustment in particularly the size of the aperture at different instances in time (corresponding to different intervals on the sequence of images). It addresses the problem that having a large spatial aperture means that there are more pixel values that can be combined so as to reduce random noise, but having a large aperture also increases the chance that a group will not meet the at least one selection criterion because of motion artifacts or illumination changes. In embodiments, the size of the aperture depends on the uniformity of the sub-set of pixels within the aperture. The uniformity can be determined using object segmentation, color segmentation and/or background-foreground segmentation. This is useful, because it helps avoid situations in which temporal changes in a value based on pixel values are detected that are not due to actual brightness variations of an object represented in the images, but due to the fact that features move into the spatial aperture over the duration of the spatio-temporal volume.

In an embodiment, groups are formed by obtaining spatio-temporal volumes of pixel values from a sequence of images at least based on the obtained sequence of images, each volume comprising pixel values within a spatial aperture from each image within an interval of the sequence, the method including using a different interval length for groups defined on different intervals of the sequence.

This embodiment addresses the problem that having long intervals can increase the amount of processing that needs to be done but will allow one to detect motion artefacts that can be removed.

In an embodiment, groups are formed by obtaining spatio-temporal volumes of pixel values from a sequence of images at least based on the obtained sequence of images, each volume comprising pixel values within a spatial aperture from each image within an interval of the sequence, wherein evaluation of the at least one selection criterion includes at least one redetermining a measure of spatial uniformity and determining a measure of temporal uniformity.

The measure of temporal uniformity can be limited to a certain frequency range. This embodiment addresses problems of unstable measurements and vulnerability to motion or illumination artifacts. By using a measure of spatial uniformity, one can select only groups with uniform areas, i.e. those meeting a minimum absolute value of spatial uniformity or those that are merely most uniform with respect to the other groups. Non-uniformity quickly leads to motion artefacts, meaning that a temporal change in color or intensity represented in a time-varying signal based on the pixel values in the spatio-temporal volume is actually due to movement of a darker or lighter region into the spatial aperture defining the spatio-temporal volume. Using a measure of temporal uniformity also helps prevent temporal variations other than those of interest from entering the time-varying signal.

In an embodiment, groups are formed by obtaining spatio-temporal volumes of pixel values from a sequence of images at least based on the obtained sequence of images, each volume comprising pixel values within a spatial aperture from each image within an interval of the sequence, and the method further includes extracting a signal section from each selected group by combining multiple pixel values from each aperture into a value.

The combination step helps remove random noise. In a particular variant, the extracting of a signal section includes obtaining a signal section representative of only temporal variations of a value based on a spatial combination of pixel values. In particular, these can be variations below a certain amplitude and/or within a certain limited frequency range, wherein the maximum amplitude can be an absolute or a relative amplitude (for example a maximum percentage of a moving average).

In a variant of this embodiment, the time-varying signal is formed by a fusion operation taking the signal sections as input, and wherein the signal sections participate in the fusion operation with different weightings determining an extent to which they affect the time-varying signal.

This embodiment takes account of the fact that some signal sections include a clearer component characteristic of the phenomenon of interest than others. For example, some sections have a relatively clear component representative of variation in skin reflectance due to blood flow. It can also be the case that certain signal sections are longer than others, so that they carry more information. This can make it useful to emphasize these sections in the fusion process.

In an embodiment of the method, the groups are formed by selecting a first sub-set of at least one pixel value from a first image at least based on one of the obtained sequence of images and locating a similar sub-set in each of at least one further image at least based on a respective one of the obtained sequence of images.

Similar sub-sets correspond in what they represent to at least a certain degree, at least after enlargement or reduction in size and/or rotation. This embodiment is useful in capturing variations in pixel values of moving objects.

In an embodiment, a similar sub-set in at least one of the further images is found by obtaining a predicted motion vector and modifying the predicted motion vector to select candidate sub-sets for evaluation, against at least one similarity criterion.

This embodiment is able to detect similar sub-sets with relatively high accuracy, because it uses a separate motion vector per sub-set, but it is not very computationally expensive, because it does not make use of an exhaustive search.

In an embodiment forming the groups includes selecting sub-sets from only limited regions of interest in each of a sequence of at least two images at least based on respective images of the obtained sequence of images.

This embodiment is able to cope with sequences of images that represent different objects of the same type, e.g. two living beings. Moreover, it is computationally more efficient.

According to another aspect of the invention, there is provided a system for forming a time-varying signal representative of at least variations in a value based on pixel values from a sequence of images, the signal corresponding in length to the sequence of images including:

an interface for obtaining the sequence of images; and a data processing system arranged to:

form a plurality of groups of sub-sets of pixel values by selecting a sub-set of at least one pixel value from each of at least two images defining an interval to form a group of associated sub-sets, such that images are covered by at least two intervals; and to select groups of sub-sets to form the signal in accordance with at least one selection criterion, wherein the selected groups of sub-sets cover different intervals, shorter than a length of the sequence.

In an embodiment, the system is arranged to carry out a method according to the invention.

According to a further aspect of the invention, there is provided a computer program including a set of instructions capable, when incorporated in machine-readable medium of causing a system having information processing capability to perform a method according to the invention.

BRIEF DESCRIPTION OF THE DRAWINGS

The invention will be explained in further detail with reference to the accompanying drawings, in which.

DETAILED DESCRIPTION OF THE EMBODIMENTS

Several embodiments of a system suitable for carrying out remote photoplethysmography will be explained herein. Photoplethysmography is a method for characterizing certain periodic physiological phenomena using skin reflectance variations. The human skin can be modeled as an object with at least two layers, one of those being the epidermis (a thin surface layer) and the other the dermis (a thicker layer underneath the epidermis). Approximately 5% of an incoming ray of light is reflected in the epidermis, which is the ease for all wavelengths and skin colors. The remaining light is scattered and absorbed within the two skin layers in a phenomenon known as body reflectance (described in the Dichromatic Reflection Model). The epidermis behaves like an optical filter, mainly absorbing light. In the dermis, light is both scattered and absorbed. The absorption is dependent on the blood composition, so that the absorption is sensitive to blood flow variations. The optical properties of the dermis are generally the same for all human races. The dermis contains a dense network of blood vessels, about 10% of an adult's total vessel network. These vessels contract according of the blood flow in the body. They consequently change the structures of the dermis, which influences the reflectance of the skin layers. Consequently, the heart rate can be determined from skin reflectance variations.

The system and methods to be described are not limited to photoplethysmograpy, but can also be used to obtain a signal including at least a component carrying information characterizing a periodic phenomenon of interest that is represented in a sequence of images. In all applications, the methods are robust to motion artefacts and changes in illumination that are unrelated to the periodic phenomenon of interest (pulsating blood flow in the ease of photoplethysmography).

Figure 1:
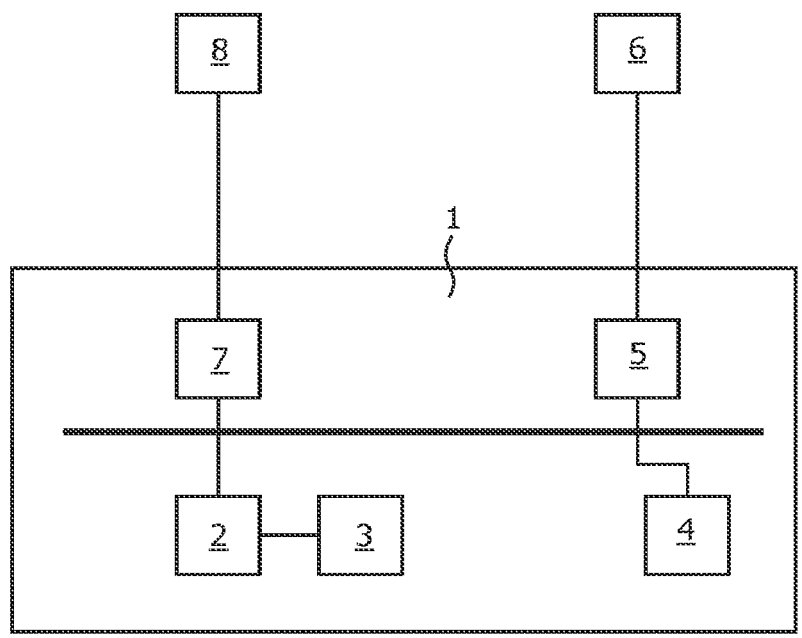
FIG. 1 is a schematic block diagram of a system for forming a time-varying signal.

The system comprises a number of components, of which only a few are illustrated in FIG. 1. The system includes a data processing system 1, which may be a general-purpose computer, and comprises a data processing unit 2 and main memory 3. It further includes a mass-storage device 4 for storing software, including software for carrying out the methods outlined herein. The data processing system 1 has an interface 5 to a video camera 6 for obtaining sequences of digital images. It also has an interface 7 to an output device 8, e.g. a visual display unit, for rendering output in a perceptible form. Of course, the data processing system 1 farther includes common functional components such as user input devices, network interfaces, etc., which are not shown separately in FIG. 1.

In an embodiment, (not shown), the data processing system 1 former includes an interlace to at least one light source, which can be a light source tuned to a particular range of the visible or near-infrared part of the spectrum of electromagnetic radiation.

The data processing system 1 is arranged to generate a first signal representative of at least variations in a value based on pixel values from each of a sequence of images captured by the video camera 6. In certain embodiments (not shown in the drawings), it is arranged to process the first signal in order to suppress or remove motion determined by separate analysis of the captured images.

In a first embodiment (FIG. 2), the method carried out by the data processing system 1 includes obtaining (step 9) a sequence of images. At least one of the images is segmented (step 10), and one or more regions of interest are selected (step 11).

The segmentation, and selection steps 10, 11 are carried out in order to identify areas representing surfaces of a certain type, in particular those meeting certain criteria. In one embodiment, regions of interest representing some or all of the faces of persons represented in the images are identified. A suitable algorithm for implementing this embodiment is described in Viola, P. and Jones, M. J., "Robust real-time object detection", *Proc. of IEEE workshop on statistical and computational theories of vision*, 13 Jul. 2001. Other suitable algorithms for recognizing image segments with certain shapes, colors and/or patterns are known, and can be used instead of or in combination with this algorithm.

The present description will proceed on the assumption that one region of interest is selected. This region of interest is tracked throughout the sequence of images. A suitable algorithm for doing this is described in De Haan et al., "True-motion estimation with 3-D recursive search block matching", *IEEE transactions on circuits and systems for video technology*, 3 (5) October 1993, pp. 368-379.

For a first pair of images in the sequence, the data processing system 1 proceeds to select from within the region of interest sub-sets of at least one pixel value. In particular, multiple sub-sets are selected from the region of interest in a first image (step 12). For each selected sub-set, a corresponding sub-set is round (step 13) in the adjacent image in the sub-sequence (generally the one following the current image, but it may be the preceding image).

Generally, each sub-set will have a plurality of pixel values, so that the step 13 of finding a corresponding sub-set in the further image includes a search for a similar sub-set according to some criterion, That is to say that the best-matching sub-set within the region of interest in the next image is found. Each selected sub-set from the first image and best-matching sub-set from the next image form a group of sub-sets. Because the sub-sets from the first image are all different from each other, for any pair of groups, the sub-sets from both the first and the next image are different.

Finding the corresponding sub-set in the next frame can include a global search for a combined set of sub-sets corresponding to the set of selected sub-sets from a first image in a next image. This is a low-cost solution, but is likely to be relatively inaccurate. Alternatively, an exhaustive search can be carried out for each sub-set of pixel values selected from a first image. This is a relatively accurate method, but computationally relatively expensive. In another embodiment, a similar sub-set is found by obtaining a predicted motion vector for that sub-set and modifying the predicted motion vector to select candidate sub-sets for evaluation against at least one similarity criterion. The modification is in the form of update vectors, which may be random. Such an approach represents a predictive search, which can be iterated several times over the sub-sets in the current image. Due to the feet that the motion vectors are found individually for each sub-set selected in the initial step 12, the sub-sets in a group match relatively well. The use of a predicted motion vector allows for an implementation with a relatively low computational cost. The predicted motion vector can be obtained by carrying out an exhaustive search for a first of the sub-sets selected in the current frame, and then using the resultant motion vector as the predicted motion vector for the other sub-sets, for example.

Next (step 14), each group is analysed. Those groups not meeting a least one pre-determined criterion are discarded (step 15). In one embodiment, the at least one criterion is a relative criterion, in the sense that the best-matching group or groups are selected. Generally, however, the at least one criterion will he an absolute criterion, because the number of groups formed will be very large, so that there will always be a few that meet the at least one criterion.

In a particular embodiment, the at least one criterion includes a criterion that each sub-set of pixel values should have a minimum spatial uniformity. In another embodiment, the at least one criterion includes at least one similarity criterion. The similarity criterion can relate to a similarity of color and/or texture, for example. In an embodiment a motion criterion is used, in the sense that connected pixels may not move more than a certain distance from image to image. Each of these criteria is designed to ensure a robustness to motion and/or illumination changes that are unrelated to the phenomenon of interest (the periodic biological phenomenon in the case of photoplethysmography).

Then, signal segments are built (step 16) for each of only the selected groups of sub-sets. In an embodiment, pixel values from within a sub-set are combined into a single value, e.g., by taking a weighted average or by finding the mean value. This is done for each of the sub-sets in the group, so that there is one such value per image. An effect is that the robustness to noise is relatively high. Other ways of extracting a signal value are possible, however. In an embodiment, the sequence of images comprises two or more sequences of image frames, each corresponding to a different channel and comprised of pixel values representing intensities of electromagnetic radiation captured in a limited range of the spectrum of electromagnetic radiation. For example, the sequence of images can comprise sequences of image frame in different color channels (e.g. Red, Green and Blue). In this alternative, the combination can involve taking a weighted sum of pixel values from each image frame forming a complete image. It can also involve a subtraction operation, e.g. a subtraction of the mean luminance across all channels from the pixel values in a channel corresponding to green light.

Then, the difference between the values associated with the respective sub-sets of a group is taken. The signal segment in an embodiment in which each group includes only sub-sets from two images thus comprises only one value. It is noted that the selection step 15 can be deferred until after the signal segments have been built, in particular in order to use a selection criterion based on the combination of values or on the difference in the combination between images. Thus, only those groups resulting in strong signal values can he selected.

The steps 12-16 are repeated for each next pair of images, so that different signal segments representing different time intervals on a time base defined by the sequence of images are obtained.

These are fused (step 17) in a final step to obtain a signal covering a time interval corresponding to the time interval covered by the sequence of images. Various methods can be used for fusion of the signal segments. The fusion can be based on finding the highest correlation between signals or on illumination of outliers, for example. Optionally, the signal sections can participate in the fusion process with different weightings determining an extent to which they affect the time-varying signal that is the outcome of the fusion step 17. For instance, the weighting value can depend on the reliability with which the sub-sets in a group are determined to match in the step 13 of finding similar sub-sets. In another embodiment, the spatial distance between sub-sets in a group at least partly determines the weighting. If the distance is large, the weight will be lower.

Figure 2:
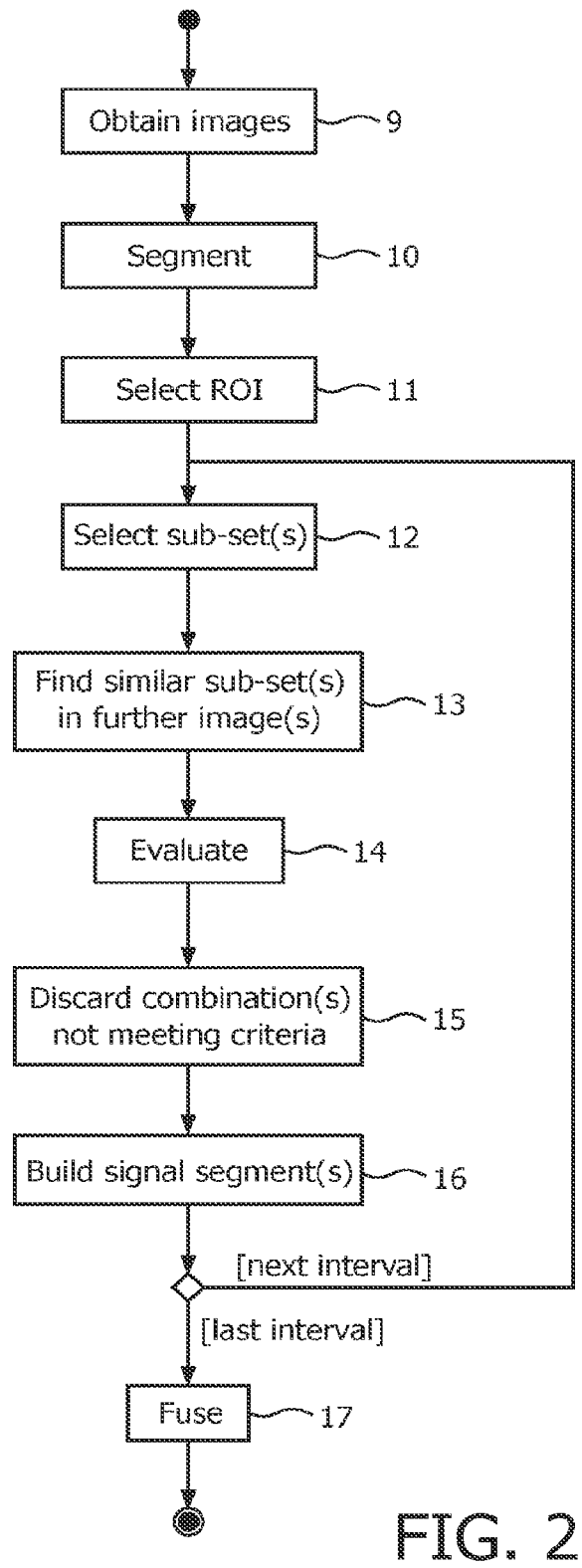
FIG. 2 is a flow chart illustrating a first general embodiment of a method of forming the time-varying signal.

Although the method of FIG. 2 has been explained using the example of groups of pairs of sub-sets from adjacent sub-sets, the method of FIG. 2 can make use of groups of three or more sub-sets from consecutive images of the sequence. The intervals defined by the groups can overlap. For example, one group can comprise sub-sets from the first to third images and another from the second to fourth images.

In yet another alternative embodiment, certain groups are not formed from sub-sets from adjacent images, but by skipping certain images. For example, in one implementation, sub-sets are selected from a first image and the most similar sub-sets in a second image are found, so that pairs of sub-sets from the first and second images are obtained. If a particular pair does not meet a certain criterion, then that pair is discarded, and a similar sub-set from the third image is determined. Interpolation can then be used to form a pair of sub-sets from which a signal section is extracted, for example. Thus, in this embodiment, following the step 15 of discarding pairs of sub-sets of pixel values that do not meet a set of at least one criterion, the step 13 of finding similar sub-sets in further images is repeated on an image further removed from the current image in the sequence of images.

In an embodiment, (not shown), an extra correction to increase the robustness to movement is carried out. The motion of at least one subject represented in the sequence of images is quantified, in order to obtain a separate signal representative of at least periodic motion of at least a certain type of a subject represented in the sequence of images. This information is then used to suppress a component of the signal obtained as a result of the fusion process. It will be appreciated that the motion of only the subject corresponding to the region of interest is analyzed. Motion analysis can be accomplished by determining a sequence of motion vectors representative of motion of the region of interest over the sequence of images. The data representative of the periodic component of motion of the living being is then determined by analyzing the repetitiveness of the motion vectors. In an embodiment, only motion within a certain range of amplitudes is taken into account. As an alternative to using motion vectors, illumination changes in a pixel value or set of pixel values can be used to infer motion. However, this Is less reliable, and the frequency of the motion cannot be determined very well.

It is observed that any of the signal that is the result of the fusion step 17, the signal obtained with the optional motion suppression step and the signal segments obtained (step 16) for various intervals can, and generally will, undergo further processing, which may include a step of extracting information corresponding to the biometrical signal of interest, e.g. filtering using an alpha trend mean filter. A further possible filtering operation is band-pass filtering.

The resultant signal can be analyzed, e.g. to obtain a value of the frequency of the periodic phenomenon of interest, corresponding e.g. to the heart rate or respiration rate. It can also be used to gate an imaging apparatus (a CT scanner, for example).

An alternative method (FIG. 3) of forming a time-varying signal representative of at least variations in a value based on pixel values from a sequence of images leaves out the step 13 of finding similar sub-sets in two or more images to form a group of sub-sets of pixel values. Instead, groups of sub-sets corresponding in position are formed.

The method makes use of a buffer of a certain number of images, to which a most recent image is added (step 18), and from which a least recent image is removed with each iteration of the method. Thus, the buffer contains a sub-sequence of a sequence of images. These are used to compose spatio-temporal volumes (step 19) by laying a grid (FIG. 3) over each of a set 20 of images. The images in the set 20 are at least based on the images provided by the video camera 6. They may be the result of filtering and/or image processing operations (not shown) to compensate for motion, camera movement and the like.

Figure 4:
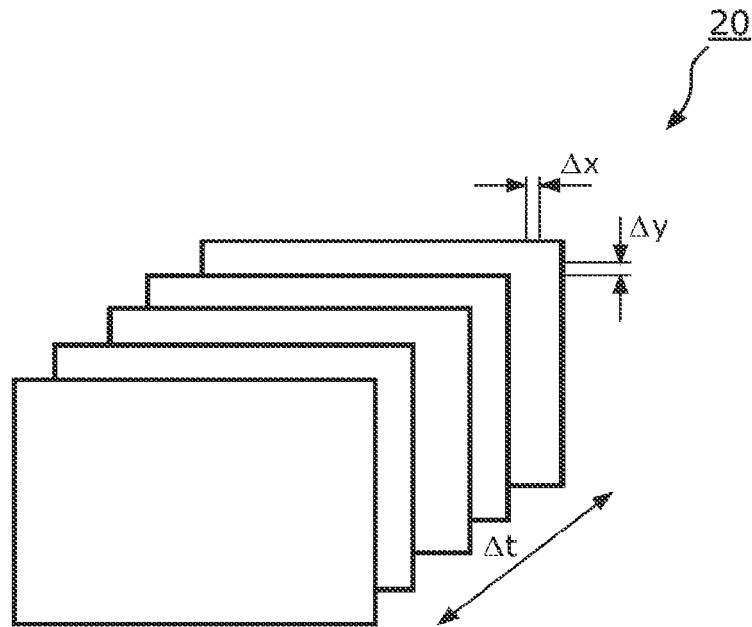
FIG. 4 is an illustration of groups of sub-sets of pixel values obtained from images covering a limited interval of a sequence of images.

The grid defines a spatial aperture with a width $\Delta x$ and a height $\Delta y$. Each spatio-temporal volume consists of the pixel values within a given one of the apertures of each of the images in the set 20. An example of a sequence 21 of sub-sets of pixel values corresponding to the pixel values within a spatial aperture is shown in FIG. 4. The number of images in the set 20 determines a time interval $\Delta t$.

The sub-sets of pixel values within each spatio-temporal volume are evaluated (step 22) against a set of at least one criterion. Only those that meet the at least one criterion are kept, and used to obtain a signal including at least a component representative of a periodic phenomenon in a living being.

Figure 3:
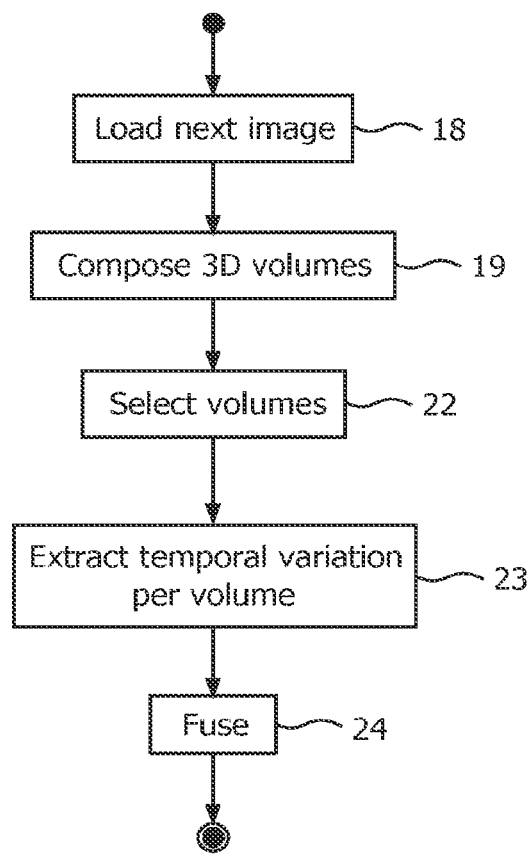
FIG. 3 is a flow chart illustrating a second embodiment of a method of forming a time-varying signal.

Generally, the same kinds of selections criteria can be used in the embodiment of FIG. 3 as have been described in connection with the selection step 14 of the embodiment of FIG. 2. Where the grid is laid over the entire image, the selection step 22 of the method of FIG. 3 will at least also include a step of evaluating whether the sub-sets of pixel values represent a surface of a certain type, e.g. exposed skin of a human being. Further selection criteria relate to the uniformity of each sub-set of pixel values and to the temporal uniformity of the sequence 21 of sub-sets. Only the most uniform, spatio-temporal volumes, or those meeting some absolute uniformity criterion are kept. The calculation of the uniformity in the spatial and temporal domains can be done using any of a number of methods, including calculations of the dynamic range, variance, entropy, etc.

The step 19 of composing spatio-temporal volumes can use a default spatial aperture and time interval $\Delta t$. In one embodiment, a different size of aperture is used with each iteration of the method of FIG. 3, i.e. for each interval of the total sequence of images that is processed. Additionally or alternatively, the length of the interval, i.e. the number of images in the set 20 is varied. The aperture size (width $\Delta x$ or height $\Delta y$) can be linked to the uniformity of the analyzed area. More uniform areas would then result in larger apertures. Other suitable influencing factors include the spatial resolution of the sensors of the video camera 6 and other features of these sensors. In other embodiments, the grid is irregular, in the sense that different apertures have different dimensions. The appropriate dimensions can also be determined by carrying out at least one of object segmentation, color segmentation and background-foreground segmentation on at least one of the set 20 of images. If the segmentation yield relatively small segments, then the apertures of the grid should also be small. The appropriate size of the interval $\Delta t$ covered by the set 20 of images will generally depend on the amount of motion present in each image. Thus, some of the analysis relevant to the selection step 22 will in these embodiments already have been carried out to compose the spatio-temporal volumes. Other factors that can determine the size of the interval $\Delta t$ include the frame rate of the video camera 6, the intensity of motion of the subject represented in the images and changes of illumination.

After certain ones of the spatio-temporal volumes have been selected, the temporal variations in a value based on the pixel values of the spatio-temporal volume are extracted (step 23) for each selected spatio-temporal volume. In this step 23, pixel values from within a sub-set are combined into a single value, e.g. by taking a weighted average or by finding the mean value. This is done for each of the sub-sets in the sequence 21 (FIG. 4), so that there is one such value per image. An effect of the combination of pixel values is that the robustness to noise is relatively high. Other ways of extracting a signal value are possible, however. In an embodiment, each image comprises two or more image frames, each corresponding to a different channel and comprised of pixel values representing intensities of electromagnetic radiation captured in a limited range of the spectrum of electromagnetic radiation. For example, the sequence of images can comprise sequences of image frames in different color channels (e.g. Red, Green and Blue). In this alternative, the combination can involve taking a weighted sum of pixel values from each image frame forming a complete image. It can also involve a subtraction operation, e.g. a subtraction of the mean luminance from the pixel values in a channel corresponding to green light.

Figure 5:
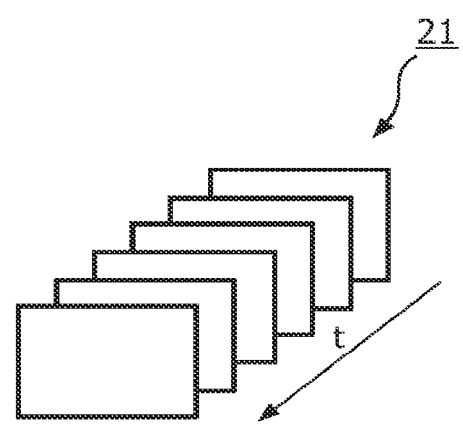
FIG. 5 is an illustration of an extraction of a signal section from a selected group of sub-sets of pixel values.
Figure 5:

As illustrated in FIG. 5, the difference between the value calculated for one sub-set of pixel values and the temporal average of the values for all the sub-sets in the sequence 21 is calculated. In general, any other method to extract a temporal fluctuations in a spatial mean luminance of color values over a certain temporal period can be used. These variations should be in a certain range of amplitude changes and frequency values.

In the illustrated embodiment, a sliding window is used to form and select spatio-temporal volumes. Thus, at each iteration, the signal segments obtained for the current set 20 of images are fused (step 24) with each other and with overlapping signal segments obtained at preceding iterations. The fusion can be based on finding the highest correlation between signals or on illuminating outliers, for example. The signal segments can participate in the fusion operation with different weighting parameters. These can depend on the length of the time interval $\Delta t$ of the associated spatio-temporal volumes (more weight being assigned to volumes with larger intervals $\Delta t$), for example.

The fused signal is used to extract the most important information, which is the heart rate in the case of heart beat signal monitoring. An alpha trend mean filter can be used to extract the part of the fused signal that is of interest from the fused signal.

A similar method of suppressing components representative of periodic motion as described above as an optional addition to the method illustrated in FIG. 2 is used in one embodiment (not shown). In that case, separate data representative of at least a periodic component of motion of a living being represented in the sequence of images being processed is obtained by carrying out video-based motion analysis of the sequence of images. One motion signal can be obtained and used at least to suppress a component of the fused signal corresponding to that periodic motion. Alternatively, separate motion signals can be obtained for separate parts of the images, and used to suppress components of the signal sections obtained for spatio-temporal volumes corresponding to those parts. In a particular variant, whether to obtain separate motion signals for suppressing at least periodic components of signal sections extracted from separate spatio-temporal volumes is dependent on the degree of difference between the motion signals.

Even without the motion suppression, the methods outlined above allow for robust extraction and analysis of temporal biomedical signals from skin areas of subjects in the presence of motion of subjects or sudden changes of illumination. The embodiment of FIG. 3, based on the construction and selection of the most reliable and temporally consistent spatio-temporal pixel volumes that are not affected by motion artefacts, can be implemented directly during the signal acquisition process.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The measure of similarity used to find similar sub-sets in the method of FIG. 2 can be limited to similarity of texture. Exact similarity of pixel values is not required.

The invention claimed is:

1. A method of forming a time-varying signal representative of at least variations in a value based on pixel values from a sequence of images, the signal corresponding in length to the sequence of images, the method comprising acts of:
receiving the sequence of images;
forming a plurality of groups of sub-sets of pixel values by selecting a sub-set of at least one pixel value from each of at least two images defining an interval to form a group of associated sub-sets using at least one of a different aperture and a different interval length for groups defined on different intervals of the sequence; and
selecting groups of sub-sets to form the signal to cover different intervals of the sequence of images by obtaining spatio-temporal volumes of pixel values from a sequence of images at least based on the received sequence of images, each volume comprising pixel values within a spatial aperture from each image within an interval of the sequence.

2. The method according to claim 1, wherein the act of forming groups comprises an act of laying a grid over at least a region of each of a plurality of images at least based on the received images to obtain spatio-temporal volumes of pixel values, each comprising pixel values of each image within a corresponding spatial aperture defined by the grid.

3. The method according to claim 2, comprising an act of analyzing for each group at least one sub-set of pixel values defined by the spatial aperture to determine whether it represents a part of a surface of a certain type.

4. The method according to claim 1, wherein the act of selecting groups comprise an act of using a different interval length for groups defined on different intervals of the sequence of images.

5. The method according to claim 3, wherein the act of selecting groups comprises an act of selecting groups of sub-sets to form the signal in accordance with at least one selection criterion.

6. The method according to claim 5, wherein each volume comprises pixel values within a spatial aperture from each image within an interval of the sequence, the method comprising an act of evaluating the at least one selection criterion determining a measure of spatial uniformity.

7. The method according to claim 5, wherein each volume comprises pixel values within a spatial aperture from each image within an interval of the sequence, the method comprising an act of evaluating the at least one selection criterion determining a measure of temporal uniformity.

8. The method according to claim 1, wherein the act of selecting groups comprises an act of selecting a first sub-set of at least one pixel value from a first image at least based on one of the received sequence of images and locating a similar sub-set in each of at least one further image at least based on a respective one of the received sequence of images.

9. The method according to claim 8, wherein the act of selecting groups comprises an act of obtaining a predicted motion vector and modifying the predicted motion vector to select candidate sub-sets for evaluation against at least one similarity criterion.

10. The method according to claim 1, wherein forming the groups comprises an act of selecting sub-sets from only limited regions of interest in each of a sequence of at least two images at least based on respective images of the received sequence of images.

11. A machine-readable non-transitory medium including a set of instructions configured to cause a system having information processing capability to perform a method according to claim 1.

12. A method of forming a time-varying signal representative of at least variations in a value based on pixel values from a sequence of images, the method comprising acts of:
receiving the sequence of images;
laying a grid over at least a region of each of a plurality of images based on the received images to obtain spatio-temporal volumes of pixel values, each comprising pixel values of each image within a corresponding spatial aperture, wherein dimensions of the grid varies spatially;
forming a plurality of groups of sub-sets of pixel values by selecting a sub-set of at least one pixel value from each spatial aperture of at least two images defining an interval to form a group of associated sub-sets using a different aperture having different dimensions defined by the grid for at least one interval of the sequence of images; and
selecting groups of sub-sets to form the signal to cover different intervals of the sequence of images by obtaining spatio-temporal volumes of pixel values from a sequence of images at least based on the received sequence of images, each volume comprising pixel values within a spatial aperture front each image within an interval of the sequence of images.

13. The method according to claim 12, comprising an act of analyzing for each group at least one sub-set of pixel values defined by the spatial aperture to determine whether it represents a part of a surface of a certain type.

14. The method according to claim 12, wherein forming the groups comprises an act of determining an aperture size separately for each of the intervals based on a uniformity of an image area within a corresponding sequence of images.

15. The method according to claim 14, wherein less uniformity of the image area results in a smaller determined aperture size and more uniformity of the image area results in a larger determined aperture size.

16. The method according to claim 12, wherein forming the groups comprises an act of determining an aperture size separately for each aperture of the grid based on a uniformity of an image area within a corresponding sequence of images.

17. The method according to claim 16, wherein determining the aperture size comprises an act of performing at least one of object segmentation, color segmentation and background-foreground segmentation on at least one image of the corresponding sequence of images.

18. The method according to claim 12, wherein the act of selecting groups comprise an act of using a different interval length for groups defined on different intervals of die sequence of images.

19. The method according to claim 18, wherein the act of selecting groups comprise an act of selecting an interval length based on an amount of motion present in each image of a corresponding sequence of images.

20. A method of forming a time-varying signal representative of at least variations in a value based on pixel values from a sequence of images, the method comprising acts of:
  receiving the sequence of images, such that any two images of the sequence define a time interval;
  composing one or more spatio-temporal volumes responsive to the received sequence of images, each composed volume comprising at least one selected spatial aperture and at least one selected time interval wherein at least a first one of the composed volumes has at least one of a different aperture and a different interval length from a second one of the composed volumes;
  obtaining at least one spatio-temporal volume, each obtained spatio-temporal volume comprising pixel values of the spatial aperture of selected of the composed spatio-temporal volumes, the pixel values being from the received sequence of images including the images of the time interval of the selected of the spatio-temporal volumes; and
  forming the time-varying signal responsive to groups of sub-sets of the pixel values of one or more of the obtained spatio-temporal volumes.

21. A system for forming a time-varying signal representative of at least variations in a value based on pixel values from a sequence of images, the signal corresponding in length to the sequence of images, the system comprising:
  a processor configured to:
    receive the sequence of images;
    form a plurality of groups of sub-sets of pixel values by selecting a sub-set of at least one pixel value from each of at least two images defining an interval to form a group of associated sub-sets using at least one of a different aperture and a different interval length for groups defined on different intervals of the sequence; and
    select groups of sub-sets to form the signal to cover different intervals of the sequence of images by obtaining spatio-temporal volumes of pixel values from a sequence of images at least based on the received sequence of images, each volume comprising pixel values within a spatial aperture from each image within an interval of the sequence.

22. The system according to claim 21, wherein the processor is configured to form groups by laying a grid over at least a region of each of a plurality of images at least based on the received images to obtain spatio-temporal volumes of pixel values, each comprising pixel values of each image within a corresponding spatial aperture defined by the grid.

23. The system according to claim 22, wherein the processor is configured to analyze for each group at least one sub-set of pixel values defined by the spatial aperture to determine whether it represents a part of a surface of a certain type.

24. The system according to claim 21, wherein the processor is configured to select groups by using a different interval length for groups defined on different intervals of the sequence of images.

25. The system according to claim 21, wherein the processor is configured to select groups by selecting groups of sub-sets to form the signal in accordance with at least one selection criterion.

26. The system according to claim 25, wherein each volume comprises pixel values within a spatial aperture from each image within an interval of the sequence, wherein the processor is configured to evaluate the at least one selection criterion to determine a measure of spatial uniformity.

27. The system according to claim 25, wherein each volume comprises pixel values within a spatial aperture from each image within an interval of the sequence, wherein the processor is configured to evaluate the at least one selection criterion to determine a measure of temporal uniformity.

28. The system according to claim 21, wherein the processor is configured to select groups by selecting a first sub-set of at least one pixel value from a first image at least based on one of the received sequence of images and locating a similar sub-set in each of at least one further image at least based on a respective one of the received sequence of images.

29. The system according to claim 28, wherein the processor is configured to select groups by obtaining a predicted motion vector and modifying the predicted motion vector to select candidate sub-sets for evaluation against at least one similarity criterion.

30. The system according to claim 21, wherein the processor is configured to form the groups by selecting sub-sets from only limited regions of interest in each of a sequence of at least two images at least based on respective images of the received sequence of images.

31. A machine-readable non-transitory medium including a set of instructions configured to cause a system having information processing capability to perform a method of forming a time-varying signal representative of at least variations in a value based on pixel values from a sequence of images, the signal corresponding in length to the sequence of images, the method comprising acts of:
  receiving the sequence of images;
  forming a plurality of groups of sub-sets of pixel values by selecting a sub-set of at least one pixel value from each of at least two images defining an interval to form a group of associated sub-sets using at least one of a different aperture and a different interval length for groups defined on different intervals of the sequence; and
  selecting groups of sub-sets to form the signal to cover different intervals of the sequence of images by obtaining spatio-temporal volumes of pixel values from a sequence of images at least based on the received sequence of images, each volume comprising pixel values within a spatial aperture from each image within an interval of the sequence.

32. The medium according to claim 31, wherein the act of forming groups comprises an act of laying a grid over at least a region of each of a plurality of images at least based on the received images to obtain spatio-temporal volumes of pixel values, each comprising pixel values of each image within a corresponding spatial aperture defined by the grid.

33. The medium according to claim 32, the method comprising an act of analyzing for each group at least one sub-set of pixel values defined by the spatial aperture to determine whether it represents a part of a surface of a certain type.

34. The medium according to claim 31, wherein the act of selecting groups comprise an act of using a different interval length for groups defined on different intervals of the sequence of images.

35. The medium according to claim 31, wherein the act of selecting groups comprises an act of selecting groups of sub-sets to form the signal in accordance with at least one selection criterion.

36. The medium according to claim 35, wherein each volume comprises pixel values within a spatial aperture from each image within an interval of the sequence, the method comprising an act of evaluating the at least one selection criterion determining a measure of spatial uniformity.

37. The medium according to claim 35, wherein each volume comprises pixel values within a spatial aperture from each image within an interval of the sequence, the method comprising an act of evaluating the at least one selection criterion determining a measure of temporal uniformity.

38. The medium according to claim 31, wherein the act of selecting groups comprises an act of selecting a first sub-set of at least one pixel value from a first image at least based on one of the received sequence of images and locating a similar sub-set in each of at least one further image at least based on a respective one of the received sequence of images.

39. The medium according to claim 38, wherein the act of selecting groups comprises an act of obtaining a predicted motion vector and modifying the predicted motion vector to select candidate sub-sets for evaluation against at least one similarity criterion.

40. The medium according to claim 31, wherein forming the groups comprises an act of selecting sub-sets from only limited regions of interest in each of a sequence of at least two images at least based on respective images of the received sequence of images.

41. A system for forming a time-varying signal representative of at least variations in a value based on pixels and corresponding pixel values from a sequence of images, the signal corresponding in length to the sequence of images, the system comprising:
   a processor configured to:
      obtain the sequence of images;
      form a plurality of groups of sub-sets of pixels and corresponding pixel values by selecting a sub-set of at least one pixel and corresponding pixel value from each of at least two images defining an interval to form a group of associated sub-sets,
      wherein, for any pair of groups with only sub-sets from the same images, the sub-sets from more than one image are different pixels; and
      select groups of sub-sets to form the signal in accordance with at least one selection criterion,
      wherein the selected groups of sub-sets cover different intervals, shorter than a length of the sequence.

42. A method of forming a time-varying signal representative of at least variations in a value based on pixels and corresponding pixel values from a sequence of images, the signal corresponding in length to the sequence of images, the method comprising acts of:
   obtaining the sequence of images;
   forming a plurality of groups of sub-sets of pixels and corresponding pixel values by selecting a sub-set of at least one pixel and corresponding pixel value from each of at least two images defining an interval to form a group of associated sub-sets, such that images are covered by at least two intervals; and
   selecting groups of sub-sets to form the signal in accordance with at least one selection criterion,
   wherein the selected groups of sub-sets cover at least one of different pixels and intervals, shorter than a length of the sequence.

43. The method according to claim 42, wherein the act of selecting groups comprise an act of using a different interval length for groups defined on different intervals of the sequence of images.

44. The method according to claim 42, wherein the act of selecting groups comprises an act of selecting groups of sub-sets to form the signal in accordance with at least one selection criterion.

45. The method according to claim 44, wherein each volume comprises pixel values within a spatial aperture from each image within an interval of the sequence, the method comprising an act of evaluating the at least one selection criterion determining a measure of spatial uniformity.

46. The method according to claim 44, wherein each volume comprises pixel values within a spatial aperture from each image within an interval of the sequence, the method comprising an act of evaluating the at least one selection criterion determining a measure of temporal uniformity.

47. The method according to claim 42, wherein forming the groups comprises an act of selecting sub-sets from only limited regions of interest in each of a sequence of at least two images at least based on respective images of the received sequence of images.

48. A machine-readable non-transitory medium including a set of instructions configured to cause a system having information processing capability to perform a method according to claim 42.

* * * * *